US009276293B2

(12) United States Patent
Xu (10) Patent No.: US 9,276,293 B2
(45) Date of Patent: Mar. 1, 2016

(54) DYNAMIC FORMATION PROTOCOL FOR LITHIUM-ION BATTERY

(71) Applicant: Southwest Research Institute, San Antonio, TX (US)

(72) Inventor: Jeff Qiang Xu, San Antonio, TX (US)

(73) Assignee: SOUTHWESTERN RESEARCH INSTITUTE, San Antonio, TX (US)

( * ) Notice: Subject to any disclaimer, the term of this patent is extended or adjusted under 35 U.S.C. 154(b) by 418 days.

(21) Appl. No.: 14/015,249

(22) Filed: Aug. 30, 2013

(65) Prior Publication Data

US 2015/0060290 A1    Mar. 5, 2015

(51) Int. Cl.
*H01M 10/0525* (2010.01)
*H01M 10/058* (2010.01)
*H01M 10/44* (2006.01)
*H01M 4/505* (2010.01)
*H01M 4/525* (2010.01)
*H01M 10/48* (2006.01)

(52) U.S. Cl.
CPC ........ *H01M 10/058* (2013.01); *H01M 10/0525* (2013.01); *H01M 10/44* (2013.01); *H01M 4/505* (2013.01); *H01M 4/525* (2013.01); *H01M 10/486* (2013.01)

(58) Field of Classification Search
CPC .................................................. H01M 10/0525
USPC ............................................ 205/82; 320/160
See application file for complete search history.

(56) References Cited

U.S. PATENT DOCUMENTS

| | | | | |
|---|---|---|---|---|
| 9,112,212 | B1* | 8/2015 | Fasching | H01M 4/134 |
| 2009/0274849 | A1* | 11/2009 | Scott | H01M 4/485 |
| | | | | 427/457 |
| 2010/0192362 | A1* | 8/2010 | Yoon | H01M 4/139 |
| | | | | 29/623.2 |
| 2011/0037439 | A1 | 2/2011 | Bhardwaj et al. | |
| 2011/0171502 | A1* | 7/2011 | Kottenstette | H01M 4/131 |
| | | | | 429/49 |
| 2012/0247963 | A1* | 10/2012 | Utsunomiya | H01M 4/0438 |
| | | | | 205/57 |
| 2013/0043843 | A1* | 2/2013 | Amiruddin | H01M 4/131 |
| | | | | 320/128 |
| 2013/0288130 | A1* | 10/2013 | Sheem | H01M 4/133 |
| | | | | 429/231.8 |
| 2014/0342244 | A1* | 11/2014 | West | C08G 59/1433 |
| | | | | 429/333 |

OTHER PUBLICATIONS

Jeff Q. Xu. "Electrochemical-Calorimetric Studies on the Thermal Characteristics of LiFePO4 Graphite Cell" EVS26 International Battery, Hybrid and Fuel Cell Electric Vehicle Symposium, May 6-9, 2012.

* cited by examiner

*Primary Examiner* — Bryan D. Ripa
(74) *Attorney, Agent, or Firm* — Livingston Law Firm

(57) ABSTRACT

A dynamic formation protocol for a lithium-ion battery cell. An "SEI formation end voltage" is identified, which is the voltage reached during formation at which the SEI layer is substantially formed. Charge rates are selected for the formation, with a first charge current rate to be used until the SEI formation end voltage is reached, and a second charge current rate, faster than the first charge current rate, to be used thereafter the SEI formation end voltage. These charge rates are applied to the cell for at least a first cycle of the dynamic formation process.

15 Claims, 9 Drawing Sheets

FIG. 5

| FORMATION RATES | INTEGRATED POWER/ENERGY IN JOULE/Wh FROM 2 TO 3.7 V | |
|---|---|---|
| C/10 | 4.11E+03 | 1.14 |
| C/5 | 2.38E+03 | 0.66 |
| C/2 | 2.81E+03 | 0.78 |
| C | 1.11E+03 | 0.31 |

DYNAMIC FORMATION PROTOCOL FOR LITHIUM-ION BATTERY

TECHNICAL FIELD OF THE INVENTION

This invention relates the lithium-ion batteries, and more particularly to the formation process of manufacturing such batteries.

BACKGROUND OF THE INVENTION

A lithium-ion battery is a member of a family of rechargeable battery types in which lithium ions move from the anode to the cathode during discharge and back when charging. Lithium-ion batteries use an intercalated lithium compound as the electrode material.

Chemistry, performance, cost and safety characteristics vary across lithium-ion battery types. Handheld electronics tend to use lithium-ion batteries based on lithium cobalt oxide ($LiCoO_2$), which offers high energy density, but can present safety risks. Other examples are lithium iron phosphate (LFP), lithium manganese oxide (LMO) and lithium nickel manganese cobalt oxide (NMC) batteries, which offer lower energy density but longer lives and better inherent safety in general. Such batteries are widely used for electric tools, medical equipment and other roles. LFP, NMC and LMO cathode-based lithium-ion batteries are leading contenders for automotive applications.

During manufacture of lithium-ion batteries, once assembly of the battery is complete, an initial charging process, referred to as a "formation process", is performed. This formation process provides the first full charge of a lithium-ion battery, and activates the cells before the battery can be used.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The three primary functional components of a lithium-ion battery are the anode, cathode and electrolyte. Typically, the anode of a conventional lithium-ion cell is made from a carbonaceous material such as graphite. The cathode is a metal oxide, and the electrolyte is a lithium salt in an organic solvent or mixed organic solvents. The electrochemical roles of the electrodes reverse between anode and cathode, depending on the direction of current flow through the cell.

Thus, a lithium-ion cell has one or more positive electrodes, one or more negative electrodes, and an electrolyte provided within a case or housing. The cell may also have separators made from a porous polymer or other suitable material between adjacent positive and negative electrodes to prevent direct contact between them. As with other batteries, a "cell" is a single unit at the base voltage. A battery can be a single cell or multiple cells connected together in series or parallel to produce a desired voltage or current.

The following description is directed to methods of improving the formation process for lithium-ion batteries. The improved formation methods are described in terms of a single cell, but can be easily adapted for batteries having multiple cells by including whatever balancing steps are necessary.

The methods are based on the recognition that the heat flow from battery cells during the formation process can be measured and used to determine an optimum formation process for a particular battery type. During formation, for lithium-ion cells having carbonaceous anode material, a desirable surface film is formed on graphite electrodes. This solid electrolyte interface (SEI) layer passivates the electrode-electrolyte interface. The exact chemical reactions during the SEI formation process are complicated, and there may be various competing reactions. Regardless of the specifics of these reactions, however, exothermic and endothermic behavior of the cell during formation can be indicative of these reactions.

For purposes of this description, an example lithium-ion battery has NCM as the cathode and graphite as the anode. However, the improved formation methods are not limited to such batteries, and may be applicable to batteries having a variety of configurations and chemistries.

Conventional Lithium-Ion Cell Formation

Conventionally, formation for lithium-ion cells is "static". Static formation is performed at various "C" (charge) rates, which are constant during the formation process. The cell is charged at a constant C-rate until a predetermined target voltage (typically the maximum operating voltage) is reached. The cell is then discharged to a predetermined discharge voltage to complete a first charge/discharge cycle. It is then charged and discharged again for one or more additional cycles.

A C-rate signifies a charge or discharge rate equal to the capacity of a battery in one hour. For example, to fully charge a 1.6 Ah battery from an empty state, or zero state of charge (SOC), C=1.6 A. A charge rate of C/2=0.8 A would need approximately two hours, and a charge rate of 2C=3.2 A would need approximately 30 minutes. In other words, the greater the charge rate, the faster the charge.

A static formation protocol often used for lithium-ion batteries is the following:

(1) A small C-rate constant charging current is applied to the cell until the target cell voltage is reached.

(2) The cell is held constant at the voltage reached in Step (1) until the current drops below a set threshold that is a small percent of the initial constant charge current.

(3) Repeat steps (1) and (2) if necessary.

(4) A same or small C-rate (such as C/2 or C/3) is used for obtaining discharge capacity after formation.

As an example, a lithium-ion cell might be charged at a relatively slow rate (such as C/10 or slower) to the maximum operating voltage of the battery. For a battery configured to have an intended operating voltage range between approximately 4.2 volts (fully charged) and 3.0 volts (discharge cut-off voltage), a formation process might involve charging the battery to a voltage of 4.2 volts at a rate of C/10 as in Step (1), and then holding the battery at the 4.2 volt level as in Step (2).

The C-rate used during formation is significant to manufacturers because a large C-rate will reduce the time required for formation. However, manufacturers are also motivated to use C-rates and other formation parameters that result in the best quality battery. In other words, although rapid C-rates are desirable in terms of reduced formation time, rapid charging does not necessarily produce the best quality battery if the SEI layer is poorly formed.

Heat Profiles During Static Cell Formation

As stated above, one goal of lithium-ion cell formation is formation of a good SEI layer. The reactions that occur during SEI formation are indicated by exothermic or endothermic behavior of a lithium-ion cell during formation. These exothermic or endothermic reactions can be monitored and measured by measuring heat generated by the cell throughout formation.

For the example data of this description, heat generated by lithium-ion cells during formation was measured by using a cell heater to maintain a constant cell temperature. More specifically, heat measurements were made using an isothermal calorimeter maintained at 30 degrees C. inside a measurement chamber. The chamber also contained at least one lithium-ion cell undergoing a formation process. Using a heater, the cell temperature was held constant at 45 degrees C. inside the chamber. Heat generation was calculated by the subtraction of current cell heater power with baseline power at 45 degrees C. during the cell rest period.

Alternatively, heat measurements can be made using an isothermal calorimeter maintained at much lower temperature than room temperature (i.e., 10 degrees C.) inside a measurement chamber by using a chiller. The chamber also contains at least one lithium-ion cell undergoing a formation process. Using a heater, the cell temperature can be held constant at least 10 or 15 degrees C. higher than chamber temperature (i.e., 20 or 25 degrees C.) inside the chamber. The 10 or 15 degrees temperature gradient is to have a suitable heat flux to ensure cell heat measurement feasible during the cell's formation. Heat generation is calculated by the subtraction of current cell heater power with baseline power at 20 or 25 degrees C. during the cell rest period.

Other equipment and techniques may also be suitable for measuring heat generated by a cell during formation.

FIGS. 1-4 illustrate four heat profiles as a function of cell voltage during static formation of different test cells of the same lithium-ion battery type. Each heat profile represents static formation of one or more test cells with a different constant charge current. These charge currents were at charge rates of C/10, C/5, C/2 and C for FIGS. 1-4, respectively.

For each heat profile, the charge rate was used to charge test cells to 4.2 V. These cells were then held at that voltage until the current dropped to 78 mA. The cells were then rested for 2 hours, and cell discharge at the same formation current was undertaken until the voltage reached 3.0 V. Two subsequent charge/discharge cycles were performed. The charge phase of each cycle is represented as Charge 1, Charge 2 and Charge 3.

A baseline heater power maintained at a constant 45 degrees C. was recorded during the cell rest period at each step in order to get a net cell heater power to reflect the heat change during reactions inside the cell. During formation, the cell heater power increased or decreased to maintain a constant cell temperature. If a chemical reaction was endothermic at a specific time, the cell heater power rose to compensate the power needed to maintain a constant temperature at 45 degrees C., and vice versa for an exothermic reaction.

As indicated by cell heat generation, the SEI layer is formed mainly during the first charge of the first cycle. The SEI formation process associates electrolyte solvent reductions at a specific voltage window, which are likely exothermic. The heat profiles show a significant amount of heat produced during charging in the first formation cycle. Heat generation during the second and third charging cycles is not as significant as during the first.

FIGS. 1-4 indicate that that considerable irreversible exothermic heat can be observed during the formation process. The heat is mainly due to the solvent reduction and SEI formation on the graphite surface. The irreversible chemical reaction which predominates the formation cycle is $Q_{irreversible}=\Delta H$. Thus, it can be measured in a test setup. In contrast, the oxidation and reduction reactions occurring at the cathode and anode through electrons travelling through an external circuit are electrochemically reversible, which can expressed as $Q_{reversible}=T\Delta S$ that also contributes to the total heat generation in the first and subsequent charge and discharge processes.

Figure 1:
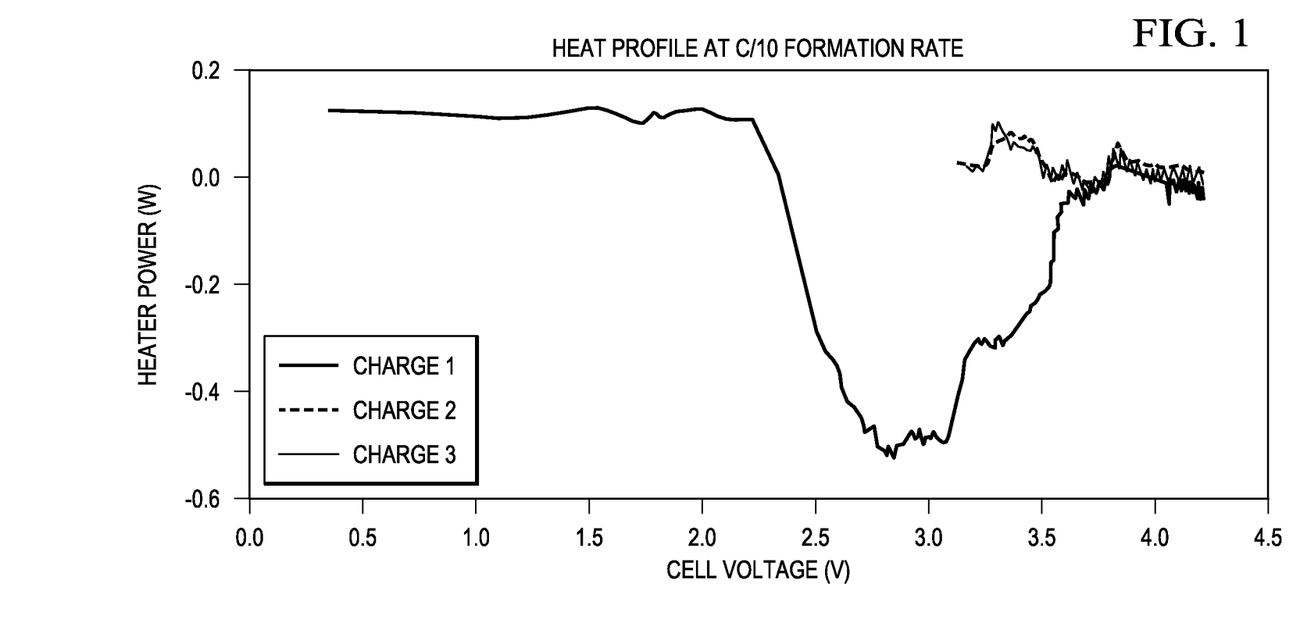
FIG. 1 illustrates a heat profile as a function of cell voltage during static formation of lithium-ion battery cells at a C/10 charge rate.
Figure 2:
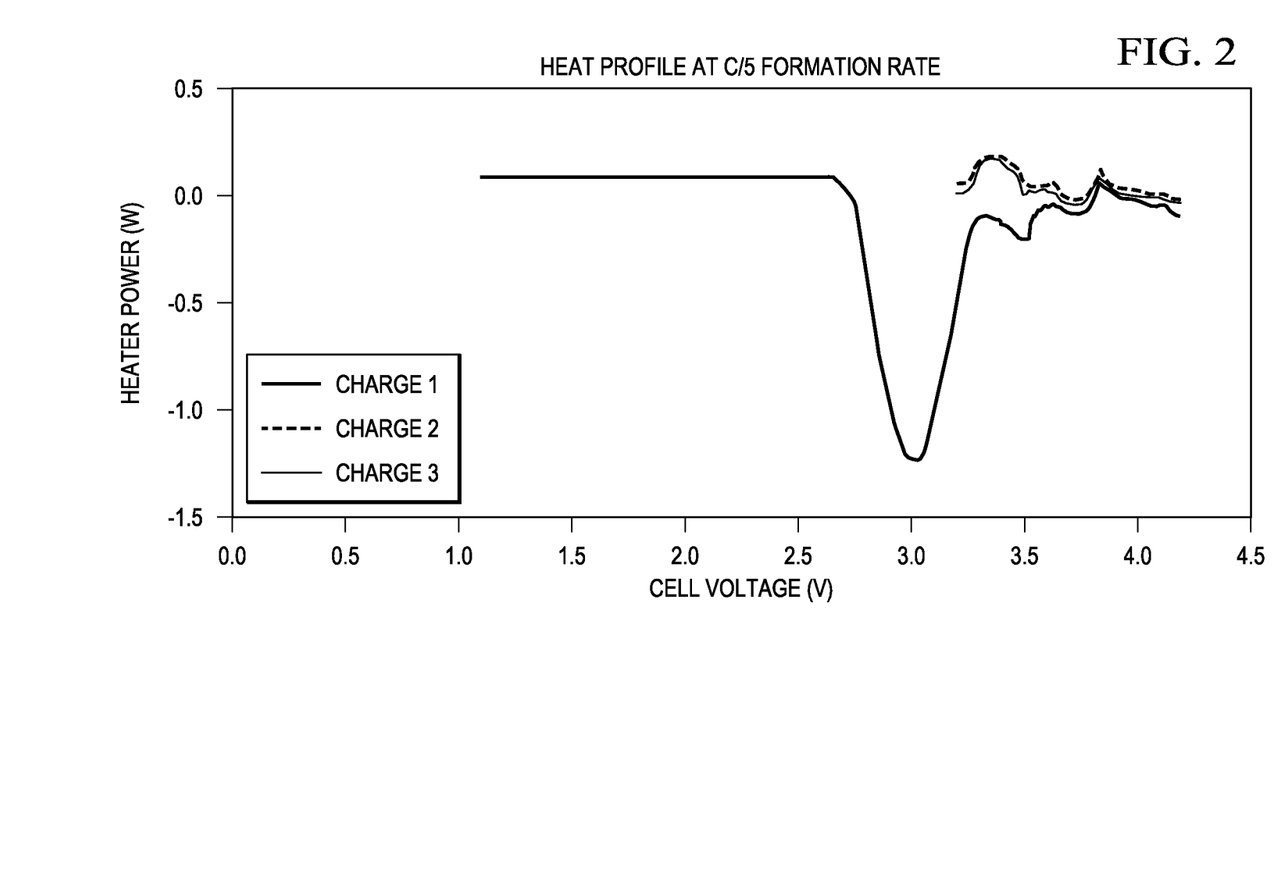
FIG. 2 illustrates a heat profile as a function of cell voltage during static formation of lithium-ion battery cells at a C/5 charge rate.

The heat profiles Of FIGS. 1 and 2 (the C/10 and C/5 formation rates) show a clear overlapping range of voltage values, beginning at approximately 3.7 V, where the first charge heat profile overlaps with the second and third charge heat profiles. This overlap indicates that the SEI formation process ends at approximately 3.7 V during the first charge. This overlap continues until the target voltage of 4.2 volts is reached.

The overlap between 3.7 volts and 4.2 volts is referred to herein as the "post SEI formation window". As explained below, an "SEI formation window" occurs from 2.0 volts to 3.7 volts, and a "pre SEI formation window" occurs before 2.0 volts. It should be understood that these values are specific to the particular battery chemistry used in the example of this description. Other batteries may be found to have different values for these windows.

Figure 3:
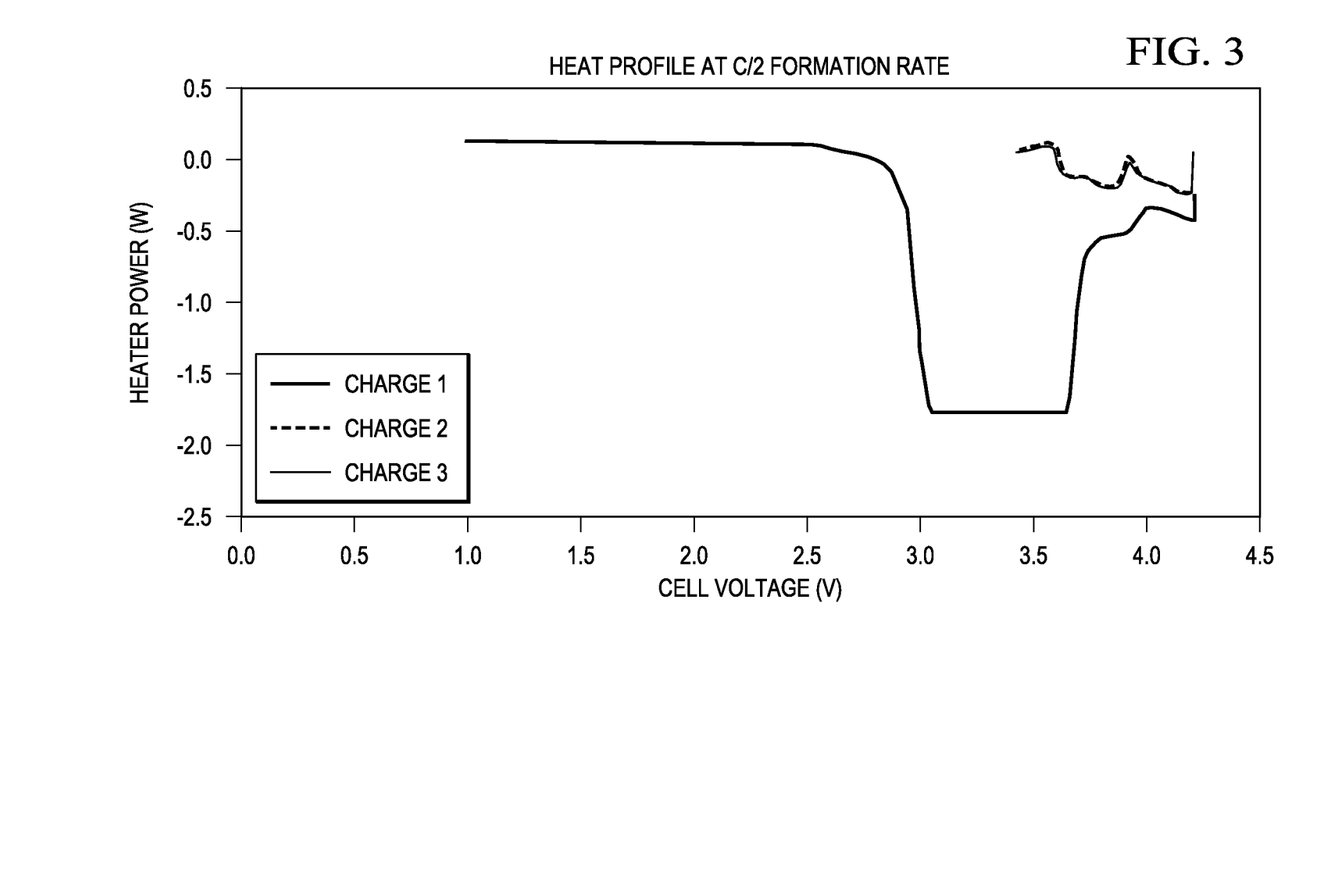
FIG. 3 illustrates a heat profile as a function of cell voltage during static formation of lithium-ion battery cells at a C/2 charge rate.
Figure 4:
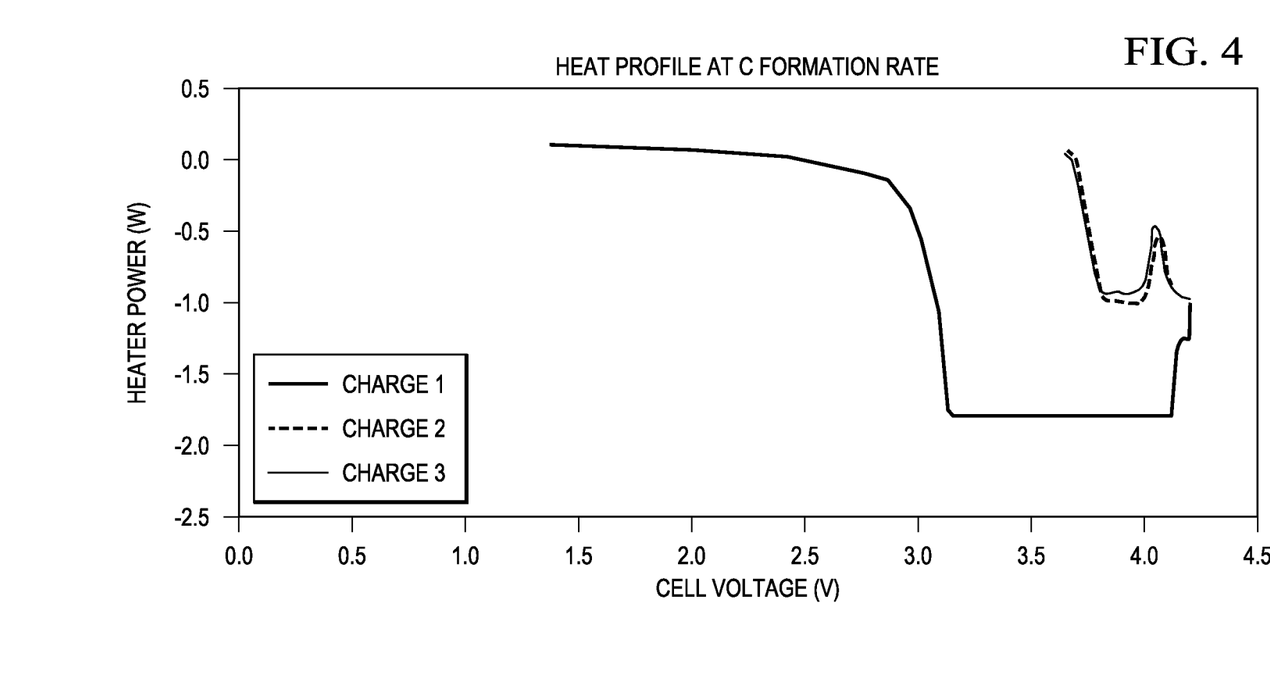
FIG. 4 illustrates a heat profile as a function of cell voltage during static formation of lithium-ion battery cells at a C charge rate.

FIGS. 3 and 4 (the C/2 and C formation rates) also show a voltage value of approximately 3.7 volts, prior to which most of the reactions occur in the first charge. During the C/2 and C formation rates, the heat profiles do not show overlapping voltage points, which may be attributable to heat generation due to Ohmic resistance at a large charging current.

The overlapping voltage point at 3.7 volts is significant to develop improved formation protocols. It indicates that most of the SEI layer is formed below 3.7 volts for this specific battery chemistry.

Figure 5:
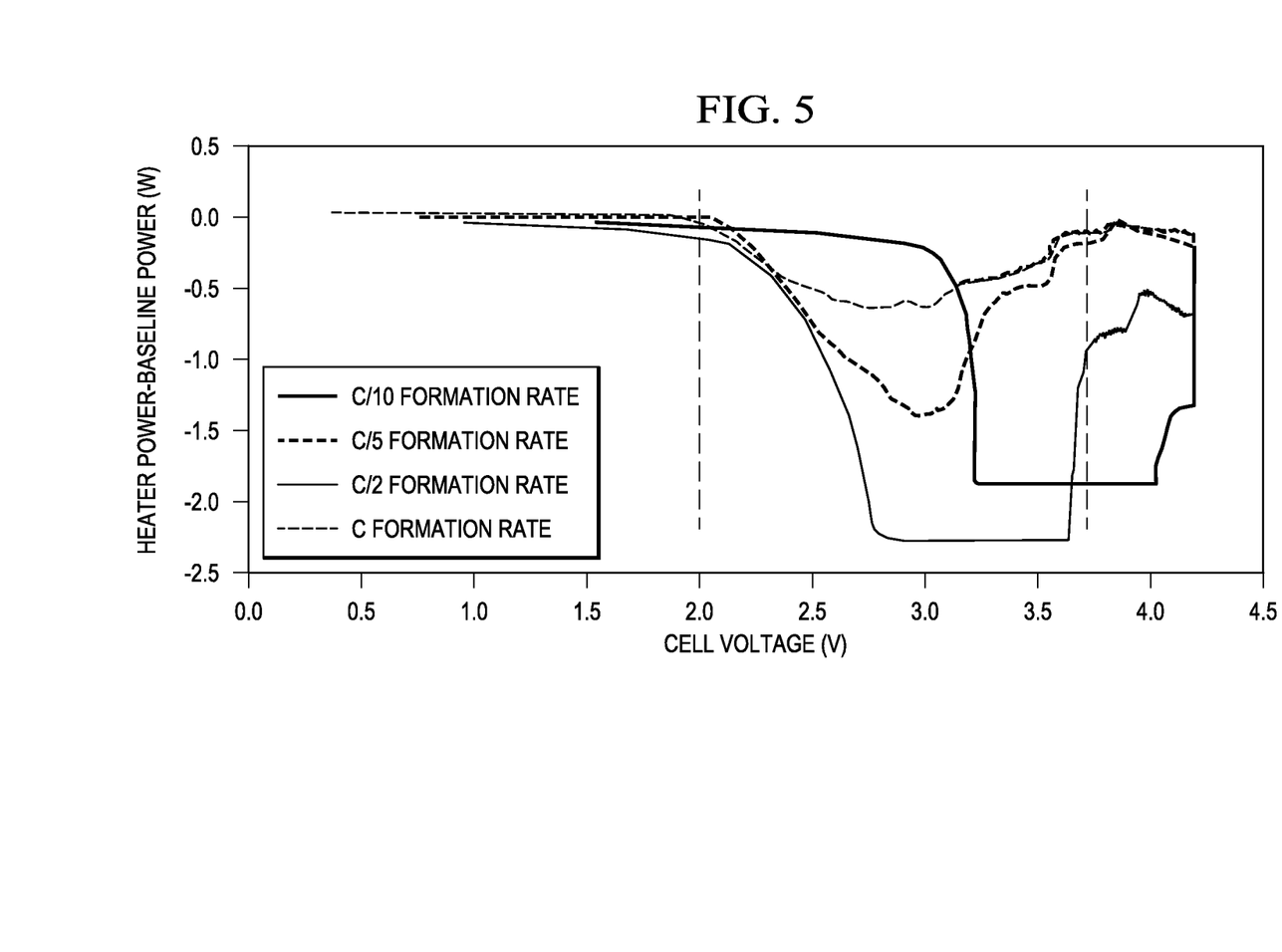
FIG. 5 illustrates four heat profiles, superimposed, for lithium-ion cells formed with static formation using C/10, C/5, C/2 and C charge rates.

FIG. 5 is another example of heat profiles, here superimposed, for lithium-ion cells formed with static formation using C/10, C/5, C/2 and C charge rates. The vertical dashed lines delineate a voltage window between 2.0 V and 3.7 V. It is during this voltage window that most reactions, and therefore formation of the SEI layer, occur. This voltage window is referred to herein as the "SEI formation window".

It should be understood that both the "SEI formation window" and the "post SEI formation window" represent periods of times during the formation process. The times occur as the voltage of the cell undergoing the formation process increases with applied charge. As explained below, during formation, these windows can be used to design a dynamic formation process in which different charge rates are used at different times. During the "SEI formation window", a "slow" charge rate may be desired for good SEI formation. During the "post SEI formation" period, a "fast" charge rate may be acceptable.

Figure 6:
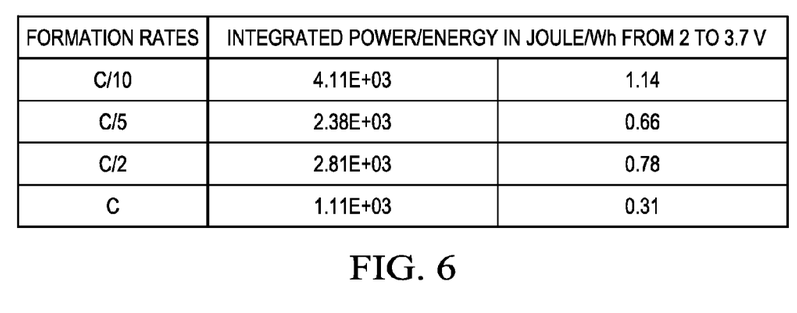
FIG. 6 illustrates power and energy generated during a 2.0-3.7 V window for cells formed at different C-rates.

FIG. 6 illustrates power and energy generated during the 2.0-3.7 V window for cells formed at different C-rates. A correction term was used to correct for measurement issues during C/2 and C formation rates. These values indicate the significance of chemical reactions during formation. They also indirectly indicate how much irreversible capacity may be lost during the process, as seen from the Coulombic Efficiency analysis discussed below. Between the cell voltages 2.0 V to 3.7 V, a C/10 formation rate has the highest reaction energy.

The significance between reversible and irreversible capacity loss is significant during the first charge. It is desired to form a good SEI layer, while avoiding irreversible capacity loss. A Coulombic efficiency close to 100% (1 unit), indicates no irreversible capacity loss. However, at the first charging, Coulombic efficiency will be less than 100% due to SEI formation caused both lithium and charge loss.

Quality Testing of Formation Protocols

Once "slow charge" versus "fast charge" windows are determined, various criteria can be used to determine specific charge rates. More specifically, cells formed with candidate formation protocols can be evaluated using evaluation tests, such as Coulombic efficiency, static capacity, impedance measurement and cycle life performance.

Figure 7:
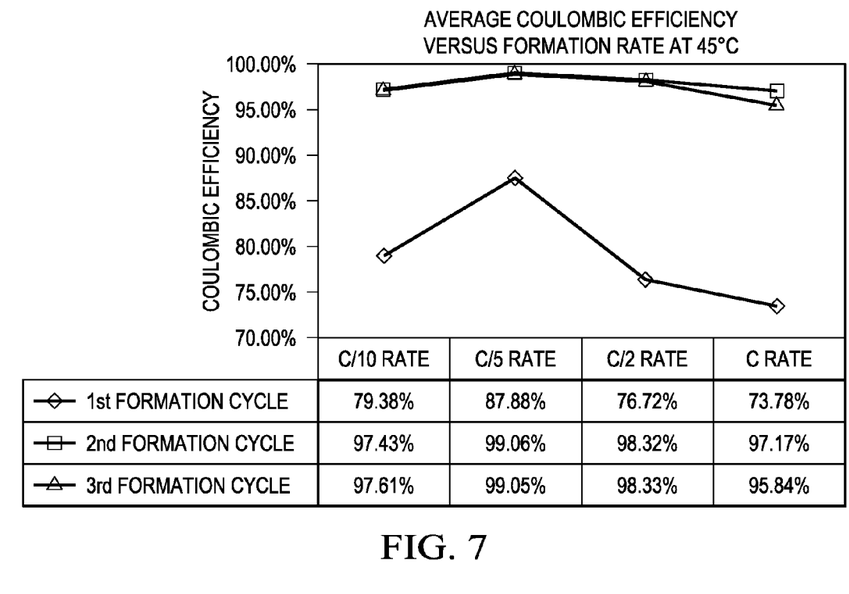
FIG. 7 illustrates averaged Coulombic efficiency for lithium-ion cells formed at different static formation C-rates.

FIG. 7 illustrates averaged Coulombic efficiency for lithium-ion cells formed at different static formation rates. Coulombic efficiency is the ratio of the Ah number of charges that enter the battery during charging compared to the Ah number that can be extracted from the battery during discharging. For the cells in question, a C/5 formation rate offers the best Coulombic efficiency at the first cycle (approximately 88%), and Coulombic efficiency is larger than 99% at the second and third cycles. At the second and third cycles, C/10 is also favorable. The results indicate that C/2 and C-rates should be avoided for the SEI formation.

Figure 8:
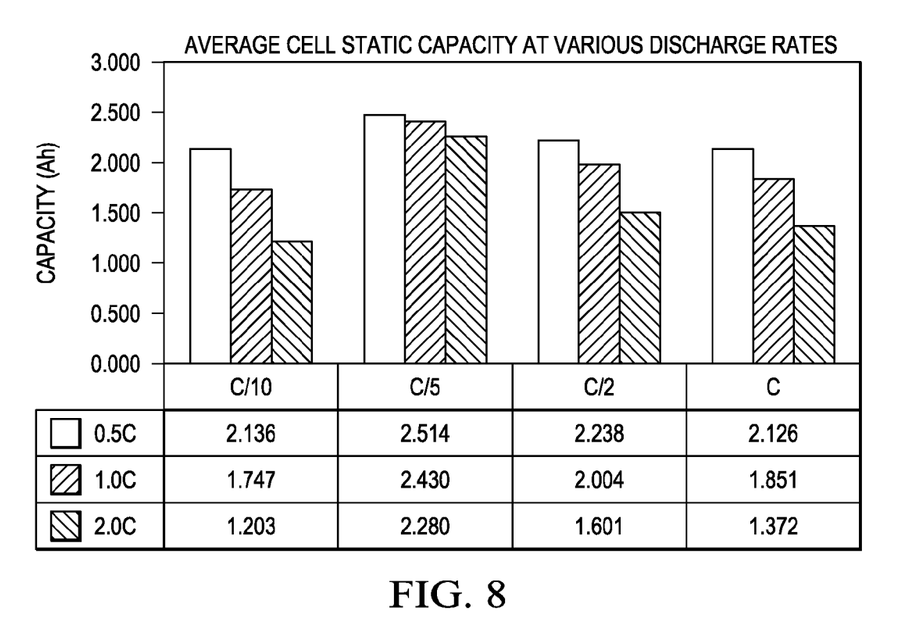
FIG. 8 illustrates averaged static capacities of lithium-ion cells formed with different static formation C-rates.

FIG. 8 illustrates averaged static capacities of lithium-ion cells formed with different static formation rates. A C/2 rate was used for charge, and C/2, 1C, and 2C were used for discharge. As illustrated, cells formed at a C/5 formation rate have the best capacity among all cells.

Figure 9:
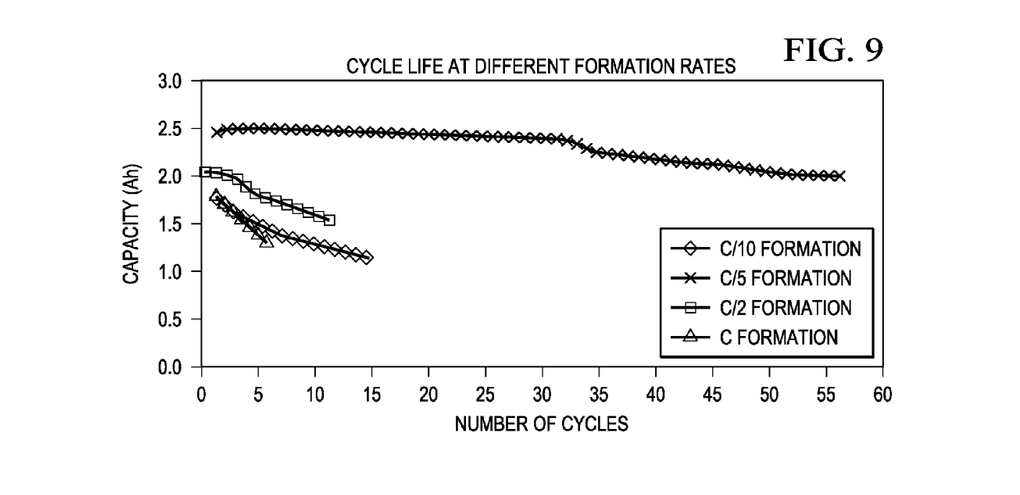
FIG. 9 illustrates the result of life cycle testing for lithium-ion cells formed with different static formation C-rates.

FIG. 9 illustrates the result of life cycle testing for lithium-ion cells formed with different static formation rates. As illustrated, cells formed at C/5 formation rates had the largest number of cycles before the capacity dropped below 80% of their original capacity.

In selecting a charge rate for the critical time of when the SEI layer is being formed (until the cell reaches 3.7 volts during formation), the above tests can be used.

For the example lithium-ion cells of this description, a C/5 static formation rate provided a significant formation efficiency. At the same time, subsequent cycle life testing indicated that the produced SEI layer was also compact and tight.

Temperature Effects on Formation Efficiency

Heat profiles during formation can be used to determine the effect of cell temperature on formation efficiency. As is known, the higher the temperature, the faster a given chemical reaction will proceed. At 45 degrees C. or higher temperatures, SEI formation reactions take place faster than the chemical reaction at room temperature, for example 25 degrees C.

Thus, during formation, it may be advantageous to place the cells in a temperature controlled chamber or other temperature controlled environment. A desired temperature can be maintained that is favorable to SEI formation, especially during the "pre SEI formation window" and "SEI formation window".

The optimum temperature to be maintained during the formation process, or at least during the "SEI formation window", may vary depending on battery chemistry. Typically, formation will be performed at temperatures ranging from 25 degrees C. to 55 degrees C. Higher temperatures may be possible, and high temperatures may be constrained by manufacturers' specifications for battery tolerance and safety.

Dynamic Lithium-Ion Cell Formation

For the example lithium-ion static formation data described above, a voltage window between 2.0 V and 3.7 V was clearly seen. Most of the SEI layer was formed before 3.7 V for this cell chemistry. Between 3.7 V and 4.2 V, the SEI layer has been formed and charging continues until the target voltage of 4.2 V is reached.

These voltage windows indicate that varying charge currents can be used during the formation process without comprising battery quality. The SEI layer may be formed during the "SEI formation window" at one charge current, with a different charge current used at other times. A formation protocol that uses varying currents during the charge phase of the formation cycle to reach the target cell voltage is referred to herein as a "dynamic" formation protocol.

Figure 10:
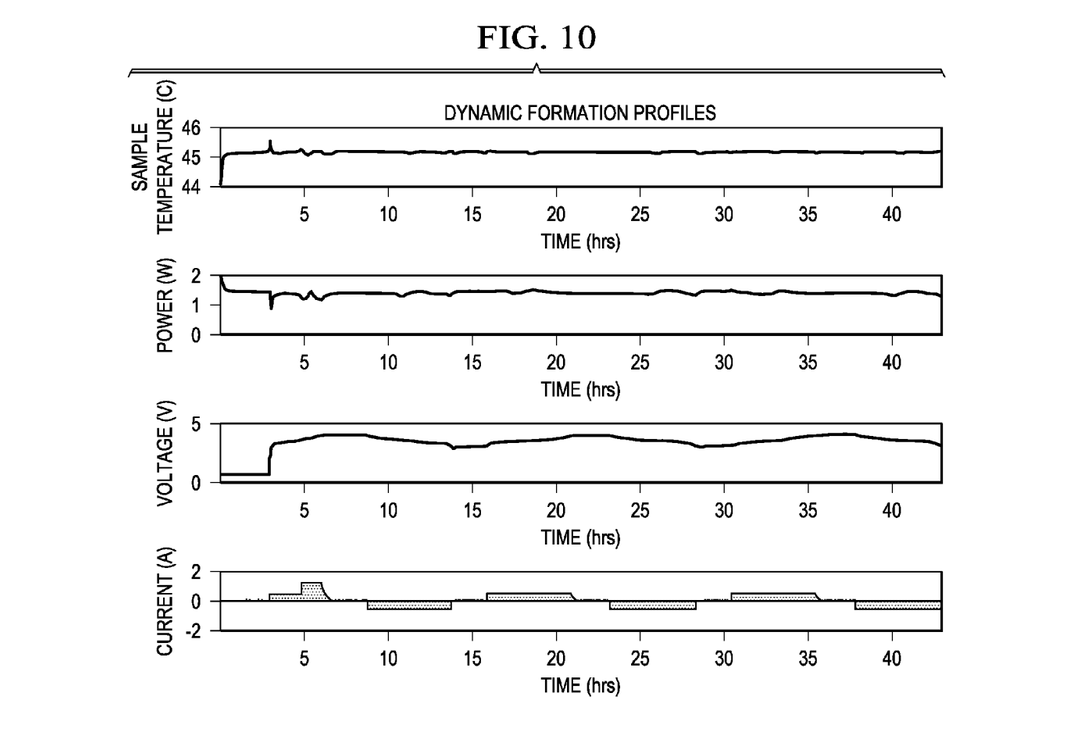
FIG. 10 illustrates an example of a dynamic formation protocol for formation of lithium-ion cells.

FIG. 10 illustrates a dynamic formation protocol for the example lithium-ion cells. In the first charging cycle, two different current values are applied, the first current being a lower current value until the voltage reaches 3.7 volts. The higher current value is then applied until the target voltage of 4.2 volts is reached.

The dynamic formation protocol of FIG. 10 may be described as follows:

1) Once the cell is placed in the cell chamber, rest the cell for 3 hours to reach 45 degrees C. thermal equilibrium;
2) Use 520 mA (the C/5 formation rate current) to charge the cell until the voltage reaches 3.7 V. After the voltage reaches 3.7 V, switch the current to 1350 mA (a bit greater than the C/2 formation rate current) until the cell voltage reaches 4.2 V. Then hold the voltage until the current drops to 78 mA;
3) Rest the cell for 2 hours;
4) Discharge the cell at 520 mA (the C/5 formation rate current) until the voltage reaches 3.0 V;
5) Rest the cell for 2 hours;
6) Charge the cell using 520 mA (the C/5 formation rate current) until the voltage reaches 4.2 V and hold the voltage until the current drops to 78 mA;
7) Rest the cell for 2 hours;
8) Discharge the cell using 520 mA (the C/5 formation rate current) until the cell voltage reaches 3.0 V;
9) Rest the cell for 2 hours;
10) Repeat steps 6) to 9) once.

The above dynamic formation protocol provides optimized formation efficiency, in terms of minimizing formation time. Experimentation shows that cells formed with this protocol maintain quality attributes, such as high Coulombic Efficiency at the first charge/discharge formation cycle, high static discharge capacity at reasonable discharge rates, and low degradation during a reasonable cycle life test.

In general, heat profiles can be used to identify a specific voltage window that is most important to form SEI layer. Charge currents are established to allow reactions to take place. A protocol having varying formation currents can be used to expedite the formation process. A slower charging current can be used until the voltage at which SEI layer is formed is reached. A faster charging current can be used thereafter until the target voltage is reached.

Heat profiles during the cell formation stage can also be applied to investigate electrolyte composition and additive functions to the improvement of battery capacity, cycle life, and safety as well.

Figure 11:
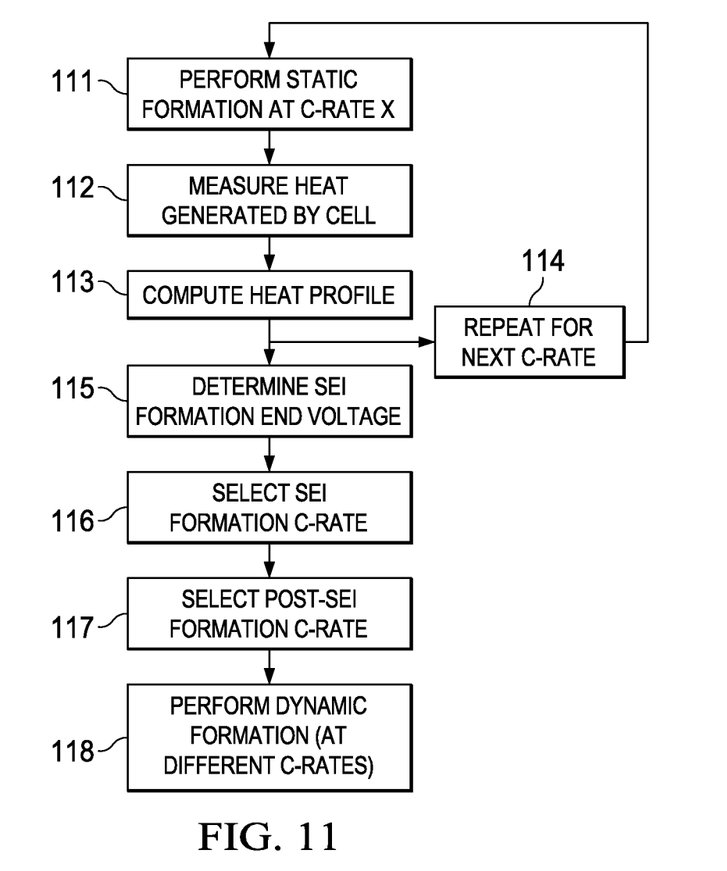
FIG. 11 illustrates a generalized method of dynamic formation of lithium-ion cells.

FIG. 11 illustrates a generalized method of dynamic formation of lithium-ion cells. Steps 111-114 involve the use of heat measurement to obtain one or more heat profiles for that type of cell, that is, cell of that structure and composition.

Step 115 is determining the time during formation that is most critical for SEI layer formation. As described above, heat profiles can be used to determine when most reactions are occurring, and thus when the SEI layer is being formed. An "SEI formation window" is identified, typically in terms of the voltage at the majority of SEI layer formation begins and ends. The voltage value at which the SEI layer is substantially complete, such as 3.7 V in the example of this description, is referred to herein as the "SEI layer formation end voltage". It should be understood that Step 115 is not necessarily performed as a production step, but rather on test cells to determine appropriate parameters to be used for production.

Steps 116 and 117 are selecting C-rates to be used during the dynamic formation. As explained above, a slower C-rate, such as the C/5 rate in the above example, may be used until the SEI layer is formed. After that time, a faster C-rate is used. In other embodiments, it may be possible to use a third, perhaps faster C-rate, in the time period before the SEI formation window, such as before 2 V in the example above.

Step 118 is a production process of performing the dynamic formation process for production lithium-ion cells, using the different C-rates. An example of a dynamic formation protocol is discussed above in connection with FIG. 10. The C-rates, temperature, and other formation protocol parameters may vary depending on the composition and structure of the production cells.

As explained above, temperature has an effect on cell reactions. Thus, additional steps of the process of FIG. 11 could be determining an optimum temperature of the cell for formation of the SEI layer, and maintaining that temperature during at least the SEI formation window of the formation process.

The invention claimed is:

1. A method of performing a dynamic formation protocol for a lithium-ion cell, the formation protocol providing a means for forming a solid electrolyte interface (SEI) layer of the cell, the method comprising:

determining a voltage value during formation at which formation of the SEI layer is substantially complete during one or more test formation processes, thereby determining an SEI formation end voltage;

selecting charge current rates for the dynamic formation protocol, wherein a first charge current rate is used until the determined SEI formation end voltage is reached, and wherein a second charge current rate, faster than the first charge current rate, is used after the determined SEI formation end voltage is reached; and applying the charge current rates to the cell at the first charge current rate and second charge current rate for at least a first cycle of the dynamic formation process.

2. The method of claim 1, wherein the step of determining a voltage value during formation at which formation of the SEI layer is substantially complete is performed by measuring heat from test cells during the one or more test formation processes.

3. The method of claim 2, wherein the test formation processes are static formation processes performed at a constant charge current.

4. The method of claim 1, wherein the step of determining a voltage value during formation at which formation of the SEI layer is substantially complete is performed by using a first static formation protocol having a first charge current rate, to charge a first test cell to a target voltage; measuring heat generated by the test cell during the first static formation protocol, thereby obtaining a first heat profile; repeating the preceding steps for at least one additional test cell of the same battery type with at least one different static formation protocol having a different charge current rate, thereby obtaining a set of heat profiles.

5. The method of claim 1, wherein the second charge current rate is used until the voltage reaches a target voltage.

6. The method of claim 1, wherein the first charge rate is used from the beginning of the first charge cycle until the SEI formation end voltage is reached.

7. The method of claim 1, further comprising the step of determining an SEI formation window during which most of the SEI formation occurs, and wherein the first charge rate is applied at least for the duration of that window.

8. The method of claim 1, further comprising the step of determining an SEI formation window during which most of the SEI formation occurs, and maintaining the cell at a predetermined temperature during that part of the formation step.

9. The method of claim 1, wherein the cell is a nickel manganese cobalt oxide (NMC) battery type cell.

10. The method of claim 1, wherein the cell has an anode made from a carbonaceous material.

11. The method of claim 1, wherein the SEI formation end voltage is approximately 3.7 volts.

12. The method of claim 1, wherein the target voltage is approximately 4.2 volts.

13. The method of claim 1, wherein the first charge rate is a C/5 charge rate.

14. The method of claim 1, wherein the formation process is performed at a controlled temperature of 45 degrees C.

15. The method of claim 1, wherein the formation process is performed at a controlled temperature ranging from 25 degrees C. to 55 degrees C.

* * * * *

UNITED STATES PATENT AND TRADEMARK OFFICE
CERTIFICATE OF CORRECTION

PATENT NO. : 9,276,293 B2  
APPLICATION NO. : 14/015249  
DATED : March 1, 2016  
INVENTOR(S) : Jeff Qiang Xu Page 1 of 1

It is certified that error appears in the above-identified patent and that said Letters Patent is hereby corrected as shown below:

On the title page item 73, the Assignee name is incorrect. The word "Southwestern" should be corrected to -- Southwest --

Signed and Sealed this
Twenty-eighth Day of June, 2016

Michelle K. Lee
*Director of the United States Patent and Trademark Office*